Patented Feb. 21, 1928.

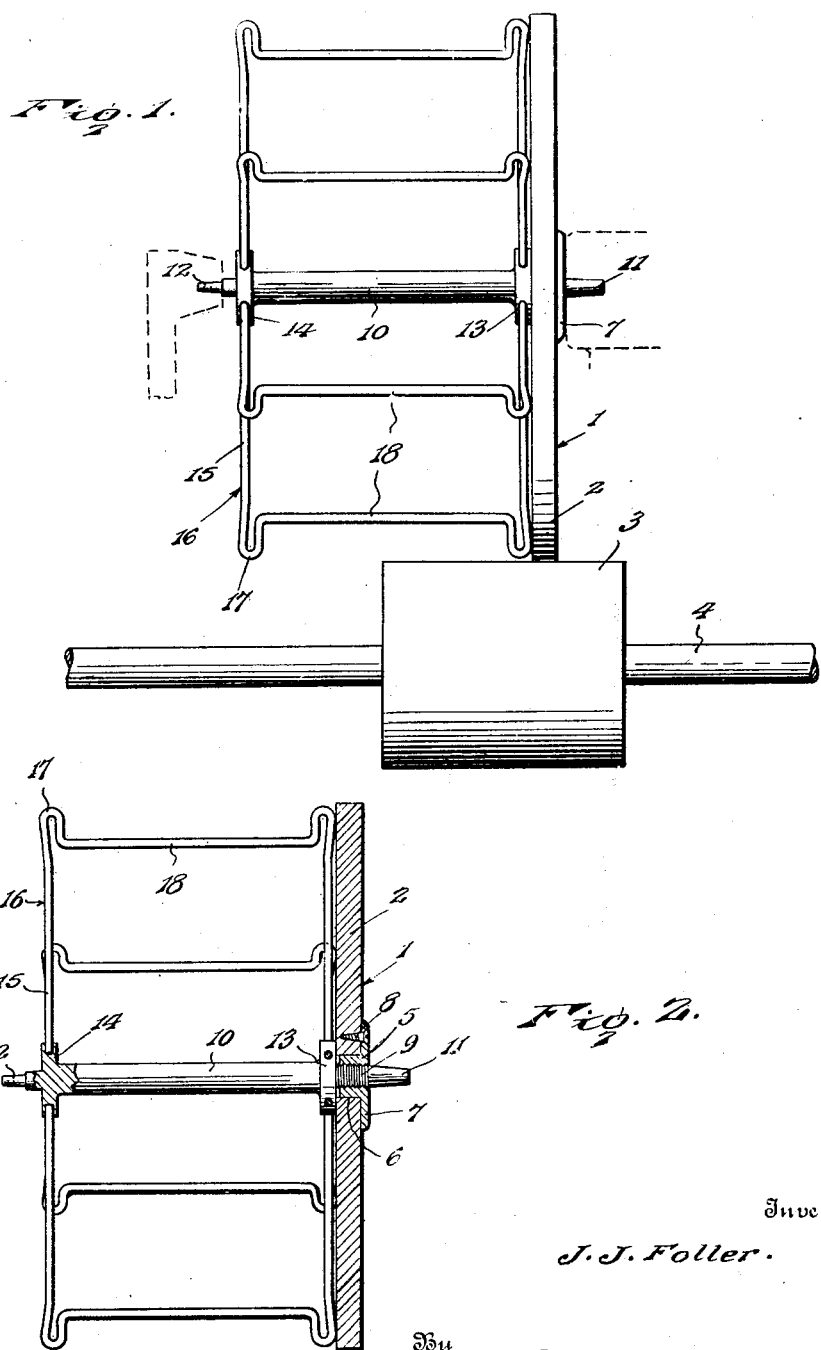

1,660,073

UNITED STATES PATENT OFFICE.

JOHN JACOB FOLLER, OF WILLIAMSBURG, PENNSYLVANIA, ASSIGNOR OF FORTY PER CENT TO LEVI SPARR, OF WILLIAMSBURG, PENNSYLVANIA.

REEL FOR SILK-WINDING MACHINES.

Application filed September 1, 1926. Serial No. 133,041.

This invention relates to improvements in the winding reels of silk winding machines and more particularly to a reel especially designed for the winding and doubling of tussah silk which, as is well known, requires care and skill to properly handle.

The reel embodying the invention is intended to perform the same work as would be accomplished by the use of as many as six of the ordinary bobbins and it is, therefore, one of the objects of the invention to so construct the reel that it will be inexpensive to manufacture so that the cost thereof will be much less than that of the total cost of the said number of bobbins.

In the accompanying drawings:

Figure 1 is a view in elevation of the reel embodying the invention, so much of the winding mechanism being likewise illustrated as is necessary to an understanding of the invention.

Figure 2 is a diametric sectional view through the reel, the spindle of the reel being shown partly in section and partly in elevation.

In the drawings, the reel is indicated in general by the numeral 1 and is mounted in the usual bearings, and the reel comprises a head 2 which may be of wood or of metal and is of circular form and designed to frictionally contact at its periphery with the surface of a friction head 3 of cylindrical form fixed upon a rotary shaft 4 such as is common to the ordinary silk winding machines, the reel being of course, arranged above the said shaft and to the rear thereof, and the usual reciprocatory bar (not shown) carrying the usual guide eyes for the silk, being arranged in advance of the gang of reels.

As stated, the head 2 of the reel may be of any material found suitable for the purpose and of any desired construction, and in the present instance, a bushing 5 is fitted into an opening 6 in the said head axially thereof and this bushing is provided with a circumscribing flange 7 secured by screws or other suitable fastening elements 8 to the head. The bushing is interiorly threaded to accommodate a threaded end portion 9 of the spindle of the reel, which spindle is indicated by the numeral 10, and outwardly beyond this threaded portion, the spindle is of reduced tapered or conical form, as indicated by the numeral 11, so as to fit within the usual tapered bearing shown in dotted lines at the right in Figure 1. The other end of the spindle 10 is likewise reduced in diameter to provide a portion 12 to fit within the other bearing for the spindle shown in dotted lines at the left in Figure 1. As these bearings and the friction drive for the reel, as well as the horizontally reciprocable bar carrying the guide eyes which serve to evenly lay the silk upon the reel, constitute no part of the invention, further description thereof is unnecessary.

The spindle is formed inwardly of its threaded portion 9 with a circular head 13 and inwardly of its tapered end 12 with a similar head 14, and these heads are provided with sockets in their peripheries which accommodate the ends of the side members 15 of radial frames 16 which constitute the skeleton body of the reel. The frames are preferably formed of stout wire and are provided with rounded bends 17 located at the outer ends of the side members 15 and connected by a cross piece 18, the bends serving to confine, to the cross pieces 18, the silk which is wound upon the skeleton body and, being rounded, serve this purpose without liability of tearing the fibers of the silk. It will be observed by reference to Figure 2 of the drawings, that when the threaded portion 9 of the spindle 10 of the reel is threaded into the opening in the bushing 5, the side of the head 13 will be brought to bear against the inner face of the head 2 of the reel and the adjacent sides of the adjacent bends 17 will substantially contact the said face of the head 2 so that the frames 16 are held relatively rigid.

It will be evident from the drawing that the skeleton frame or body of the reel embodying the invention is of considerably greater diameter than the bobbins ordinarily employed in silk winding machines. Therefore, in a given period of time, a greater length of silk will be wound upon the reel embodying the invention than upon the ordinary bobbin and, furthermore, the reel embodying the invention accomplishes this result at a lower speed of rotation so that there is less likelihood of the silk being broken.

Having thus described the invention, what I claim is:

1. A reel for silk winding machines comprising a circular drive head, a spindle extending axially from one side of the head, and a skeleton body comprising inner and outer frames mounted upon and extending radially from the spindle and having outer transverse members and outwardly extending guard portions at the ends thereof, the guard portions of the inner frames being in intimate contact with the drive head.

2. A reel for silk winding machines comprising a circular drive head, a spindle extending axially from one side of the head, and a skeleton body comprising a plurality of frames including side members secured upon the spindle at their inner ends, the frames extending radially from the spindle and the said frames further including outer transverse members extending between the side members, and bends at the juncture of the side members and the transverse member to constitute guard portions, certain of the guard portions being in intimate contact with the drive head.

3. A reel for silk winding machines comprising a circular drive head, a spindle extending axially from one side of the head, heads upon the spindle, and a skeleton body comprising a plurality of frames having side members fitted at their inner ends in sockets in the said heads upon the spindle, the frames extending radially from the spindle and having outer transverse members and outwardly extending guard portions at the ends thereof, certain of the guard portions being in intimate contact with the drive head.

4. A reel for silk winding machines comprising a circular drive head, a bushing fitted within the head axially thereof and having a threaded bore, a spindle having an end threaded into the said bore of the bushing and extending laterally from one side of the head, the spindle having journaled portions at its ends, and a skeleton body comprising inner and outer frames mounted upon and extending radially from the spindle and having outer transverse members and outwardly extending guard portions at the ends thereof, the guard portions of the inner frames being in intimate contact with the drive head.

In testimony whereof I affix my signature.

JOHN JACOB FOLLER. [L. S.]